Jan. 22, 1963 McCONNELL SHANK ET AL 3,075,036
BATTERY AND COVER
Filed June 20, 1960 2 Sheets-Sheet 1

Inventors:
McConnell Shank
Verlin A. Mocas
By John L. Hutchison
Attorney.

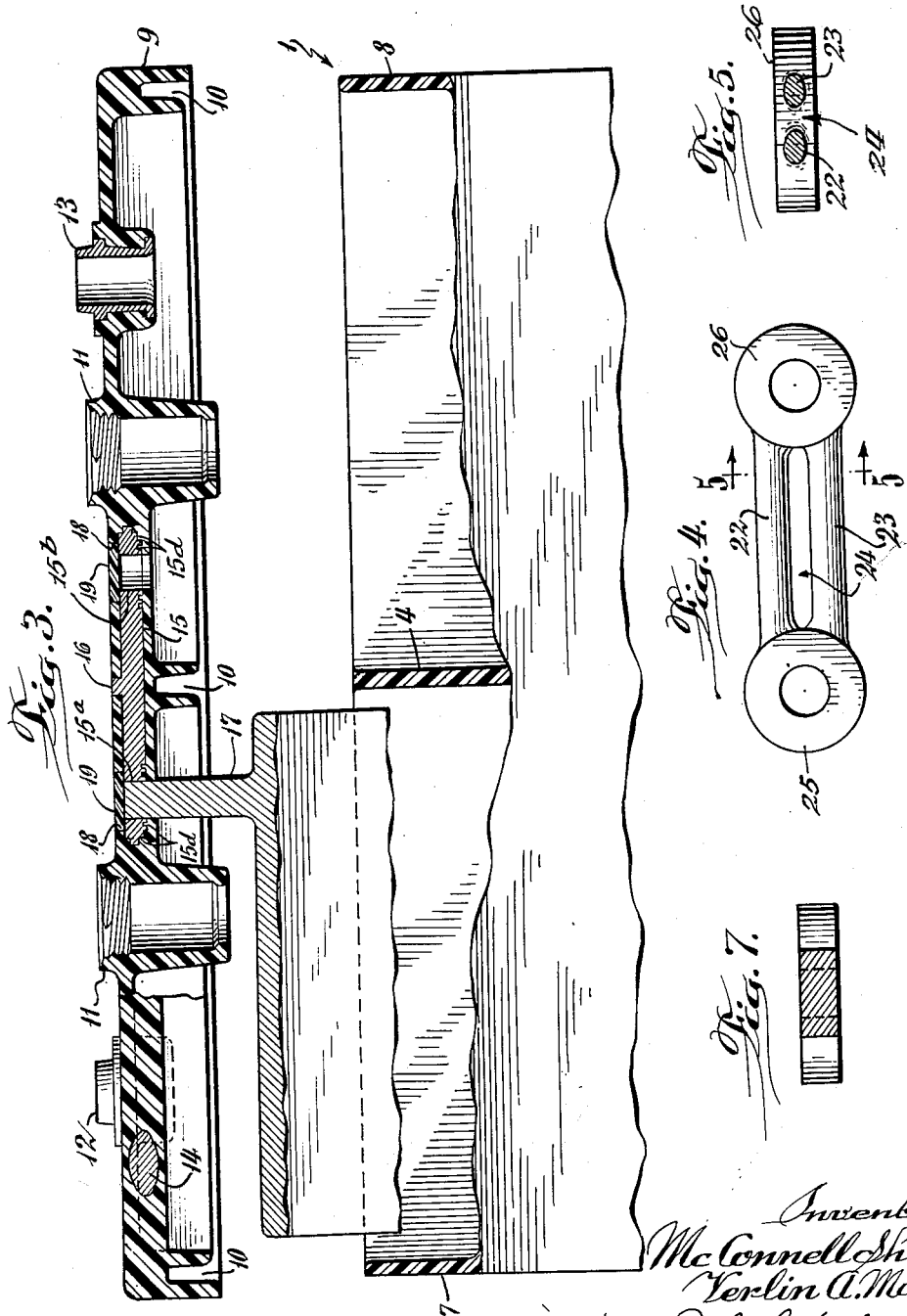

United States Patent Office 3,075,036
Patented Jan. 22, 1963

3,075,036
BATTERY AND COVER
McConnell Shank, Oak Park, Ill., and Verlin A. Mocas, Indianapolis, Ind., assignors to The Richardson Company, Melrose Park, Ill., a corporation of Ohio
Filed June 20, 1960, Ser. No. 37,250
3 Claims. (Cl. 136—134)

This invention is concerned with storage batteries and, more particularly, to an improved one-piece cover and associated cell connectors therefor.

Various types of storage batteries are currently being manufactured for a variety of uses. Such batteries comprise a housing or case provided with a plurality of compartments forming cells for the batteries. Each cell includes electrolyte and a plurality of plates containing an active component. The plates are usually separated by porous diaphragms and are divided into negative and positive assemblies. Each plate assembly is connected to a common terminal which normally projects through the cell cover permitting external connections for electrically joining various cells together and for installation of a battery into a desired circuit. At present, the cells of a majority of the batteries made are provided with individual covers. Covers of this type are exemplified by the structure shown in, for example, the Rieser Patents 2,189,327 and 2,223,226. As illustrated in the drawings of these patents, each of the individual cell covers is normally provided with a filling well and two additional openings through which the terminals associated with the negative and positive plate assemblies project. Also, as indicated, connections between cells are made above the surface of the covers on top of the batteries. Frequently, the covers are formed with depressions adapted to receive the external cell connectors, which depressions can subsequently be filled with mastic to protect and obscure the connections. Each of the individual cell covers is usually sealed in place with a suitable mastic, which may be continuous with or separate from the mastic used to protect the terminal connectors.

Separate external connections between cells, as is characteristic when using individual cell covers, has certain disadvantages in that such connections require time-consuming assembly operations, not only in actually making the connections, but also in applying the aforementioned mastic to protect and obscure the connections. Additionally, the application of a cover to each cell is time-consuming and laborious.

To overcome certain of the disadvantages which are inherent in using individual covers with each cell, as encountered above, it has been proposed that a single one-piece cover be employed having cell connectors embedded within the cover. Such one-piece covers are disclosed in the patents to Hess 2,100,333 and King 2,222,- 412. Both of these patents illustrate one-piece covers which may be applied over all of the cells of a battery and, further, provide for cell connectors embedded in and integrally united with the covers. However, generally, all of the one-piece covers heretofore proposed are characterized by having either connections between cell terminals or the terminals themselves disposed above the surface of the covers, whereby a plurality of metallic elements are exposed on the top of the battery. Such exposure is considered to be somewhat undesirable from an appearance standpoint and, in addition, presents the possibility of short-circuiting and discharge of cells by external metallic articles inadvertently contacting the exposed terminals or connections.

Further, in making one-piece covers wherein connectors are embedded in the cover, problems are created with respect to molding and, particularly, with reference to the flow of plastic compositions around the connectors. In many instances, knit lines or cracks will be formed in the cover due to the obstruction to material flow presented by the connectors.

Accordingly, it is one object of the present invention to provide a new and improved one-piece cover for multicell storage batteries having the cell connections embedded within the cover.

Another object is to provide a new type of cell connector which may be embedded in a one-piece cell connector and which eliminates, to a great extent, molding problems and material flow problems which have been heretofore encountered when making a one-piece cell cover.

A further object is to provide a storage battery having a minimum exposure of metallic elements.

These and other objects will become more apparent from the specification set forth hereinafter.

In the drawings, FIGURE 1 is a plan view of an exemplary storage battery container having six cells.

FIGURE 3 is a partial elevation, in cross section, illustrating the relationship of a one-piece cover and its associated battery container, that portion of a cover shown being taken along line 3—3 of FIGURE 2.

FIGURE 4 illustrates a modified type of cell connector.

FIGURE 5 is a cross section of the cell connector of FIGURE 4 taken on line 5—5.

FIGURE 7 is a cross section of a cell connector of the type commonly used in association with one-piece cell covers.

Figure 1:
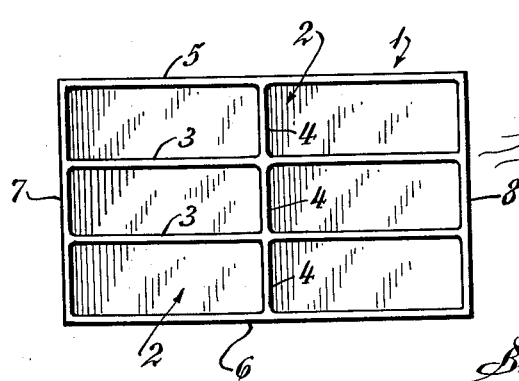

Turning now to the drawings and initially to FIGURE 1, the numeral 1 indicates, generally, the housing or container of a storage battery, which is provided with a plurality of cells 2 formed by partitions 3 and 4 extending between side walls 5 and 6 and end walls 7 and 8. A battery of this type normally supplies twelve volts based on the fact that each of the cells, individually, is capable of supplying two volts, the cells being connected in series. Each cell compartment contains electrolyte and positive and negative plate assemblies, together with porous diaphragms or separators disposed between the plates. Each set of plates within a cell, as previously indicated, is connected to a common terminal projecting upwardly from the cell for purposes of making connections between cells and also externally of the battery.

Figure 2:
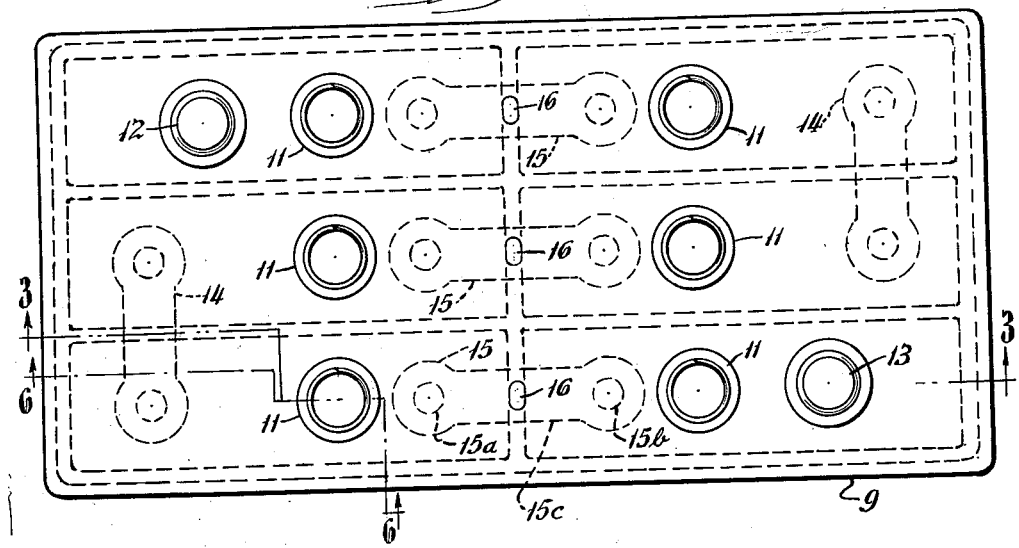
FIGURE 2 is a plan view of the one-piece cover contemplated by the present invention.

In FIGURE 2, there is shown a one-piece cover of the type contemplated by the present invention. In this figure, the numeral 9 indicates the cell cover which may be molded from any appropriate material, such as a natural or synthetic rubber or a resin, for example, polyethylene, polystyrene or a similar synthetic polymer. The one-piece cover 9 is adapted to provide a closure for all of the cells of the battery and is held in place on the top of the container by means of channel-like recesses 10 adapted to receive the upper edges of the container sides and partitions. For the purpose of inserting electrolyte into each cell, there is provided a plurality of filling wells 11, appropriately positioned in the cover over each cell compartment. Openings 12 and 13 are also provided in the cover through which positive and negative terminals of the battery may project, thereby permitting external connections to the battery.

Embedded within the cover are lead cell connectors 14 and 15 which, as indicated, are so disposed within the cover as to extend over the partitions of the cells to enable connection with the desired terminals of adjacent cells. The manner in which these cell connectors are embedded within the cover and the configuration or design of the connectors will be more fully disclosed hereinafter.

Each of the connectors comprises an elongated body having terminal-receiving openings in each end. Thus, for example, connector 15 comprises an elongated body 15c and two enlarged ends which are provided with transverse terminal-receiving openings 15a and 15b.

Due to the general design of the battery and the cell compartments, certain of the cell connectors may be longer than others. For example, in FIGURE 2, it will be noted that connectors 15 are somewhat longer than connectors 14, this being due to the fact that the terminals of the cells which are electrically united by connectors 15 are spaced further apart than are the terminals to be electrically united by connectors 14.

Connectors 15, as distinguished from connectors 14, are provided with relatively small, upwardly extending projections 16 disposed intermediate of the connector and terminating at the surface of the cover. As indicated, these projections are relatively small as is the portion thereof which is exposed at the surface. The exposed portion of the projections 16 may serve to permit external testing of cells of the battery, however, their principal purpose is to provide a supporting means for the connectors and prevent their deformation during molding, as will be more fully explained hereinafter.

In order to more firmly embed the cell connectors 14 and 15 within the body of the cover, each of the connectors preferably contain a plurality of recesses or serrations, such as recesses or serrations 15d, which serve to more firmly embed the connector in the cover body and prevent its loosening within the cover.

In FIGURE 3 is illustrated the manner in which the terminals 17, associated with the plate assemblies of each cell, are joined to the connectors. Such a joint is formed after the cover is applied to the battery by a process known as "burning," wherein the lead terminals and the lead connectors are fused by heat, forming an integral bond between the two elements. This is a well-known process and need not be discussed in further detail herein.

Each of the covers is provided with a recess 18 immediately above the terminal receiving openings in the end of the connectors to enable the aforementioned burning process to be accomplished for uniting the plate terminals with the connectors. It should be noted that the terminals 17 and connectors are joined at a point wholly within the body of the cover and that terminals 17 do not project above the surface of the cover. After the terminals and the connectors have been united, recess 18 may be filled with a mastic 19 level with the surface of the cover, thereby forming a continuous covering and completely obscuring and projecting the connection. Similar connections between desired terminals of all of the cells are contemplated in addition to the particular connections shown in FIGURE 3. The only appreciable metallic elements exposed above the surface of the substantially planar cover 9 would be the positive and negative terminals of the battery, as would be necessary to permit external connections to the battery.

The design of the cell connectors 14 and 15 is of importance with respect to insuring proper flow of molding compositions and is, perhaps, best illustrated in FIGURE 3. In this figure, it will be noted that the cross section of connector 14 is shown as having a generally oval shape. Such a shape is to be distinguished from the rectangular shape of many connectors heretofore employed and illustrated in FIGURE 7. Preferably, the connectors are designed whereby, when viewed in transverse cross section, for example, the upper and lower surfaces, particularly of the elongated body portion of the connector, approach each other to produce a pronounced taper or bevel from the center of the connector toward the sides. This taper or bevel may take an oval-like shape, as indicated in FIGURE 3, with respect to connector 14 or, for example, even a diamond shape with more regularly sloping sides. In any event, when viewed in transverse cross section, the upper and lower surfaces should approach each other to produce a pronounced taper as compared to a rectangular type of cross section. Such a connector design markedly improves the flow of plastic material around and under the connector during the formation of the cover. It has been found that, if a connector having a rectangular cross section is inserted into the cavity of a mold, the plastic material forced into the cavity to form the cover is offered substantial obstruction and resistance in attempting to find its way around the connector, to the extent that the portion of the cover body immediately surrounding the connector is not always continuous and frequently will be found to have knit lines, cracks and other defects.

Figure 6:
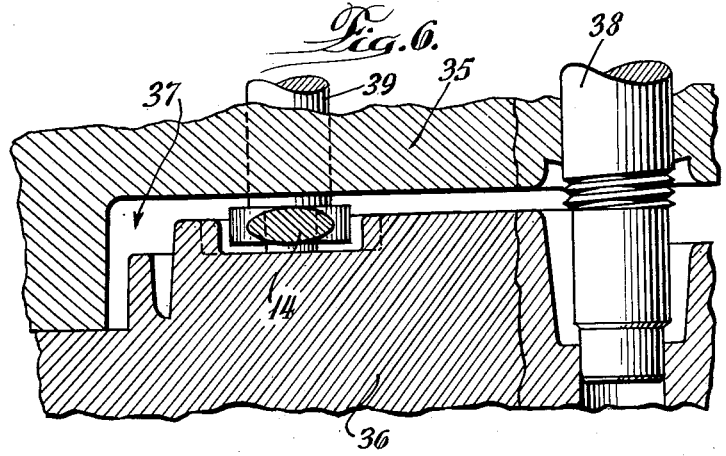
FIGURE 6 is a partial elevation, partly in cross section, of a mold assembly used in making covers contemplated by the present invention.

For purposes of discussing the general molding techniques involved in making one-piece covers with embedded connectors, as contemplated herein, reference will be made to FIGURE 6. In FIGURE 6, the numerals 35 and 36 represent the complementary sections of a mold which, when disposed in the closed position, are adapted to form a mold cavity 37 having the desired configuration of the cover. Pin 38, extending through the mold cavity, is provided in order to form the hollow filling well 11 of the cover.

Prior to closing the mold, the connectors are inserted within the cavity of the mold in the desired locations. The plastic material from which the cover is formed will be forced into the cavity 37 and around the connector, thereby embedding the connector within the cover. For purposes of retaining connectors in the desired location with the mold cavity and also to form the recess 18 in the cover immediately above the terminal-receiving openings of the connector, there is usually provided pin 39 which also serves to retain the connector in position.

As previously indicated, a number of the cell connectors will be longer than other cell connectors due to the distance between the terminals of adjacent cells which are required to be electrically united. Thus, connectors 15 are usually somewhat longer than connectors 14. It has been found that, when connectors 15 are inserted within the cavity of a mold, for example, cavity 37 disclosed in FIGURE 6, and plastic material forced around the connectors, the pressures used to force the plastic material into the cavity are of such a nature that the connector frequently is deformed due to its relatively long length. This deformation, in some instances, results in a portion of the connector being forced against the surface of the cavity of a mold preventing proper dispersion of the plastic material about the connector and, accordingly, resulting in the production of defective covers. As previously indicated, one mechanism which has been developed for overcoming deformation of the elongated body portion of the connector is to provide projections 16 intermediate of the connector. This projection is relatively small and is adapted to extend between the connector and the surface of the mold cavity, thereby supporting the elongated body of the connector in position and preventing its deformation under the forces employed in molding. By use of the projections 16, the elongated body of the connector is retained in a desired position, permitting the plastic material to be properly dispersed around the connector. When the cover is molded, the surface of the projection 16 will be exposed, but flush with the surface of the cover. The dimensions of the projection will be such that, in general, its exposed surface will have a maximum dimension of about one-fourth of an inch.

As an alternate, the projection 16 may be omitted, and in lieu thereof, a projection provided extending upwardly from the cavity surface upon which the center part of the connector may rest. Such a projection extending from the surface of the mold cavity will, likewise, offer support to the elongated body of the connector and prevent its deformation during the molding operation. The use of such an alternate support for a connector, while in a mold cavity, will, of course, leave a slight depression extending below the surface of the cover and exposing a small portion of the connector beneath the surface of the cover. This exposed portion of the connector may be left uncovered if desired for purposes of making tests between cells but, preferably, the depression will be filled with mastic to provide a continuous covering.

A further modification of the connector is disclosed in FIGURE 5 wherein the elongated body of the connector comprises two parallel, horizontally spaced elements 22 and 23, each of which preferably should have a pronounced taper of its upper and lower surfaces in the same manner as previously described in connection with the connectors 14 and 15. The space 24 between the elements 22 and 23 permits molding material from which the covers are formed to be even more readily dispersed around the connector. Such a connector is also provided with the usual ends 25 and 26 having the associated terminal-receiving openings.

The one-piece cover, as contemplated herein, is substantially planar as distinguished from many individual or even one-piece covers heretofore proposed which, generally, provide for pronounced high and low areas. Further, the present covers enable all connections between cells to be positioned beneath the surface and within the body of the cover, such that the only major metallic elements exposed above the surface are the positive and negative terminals. The one exception is that wherein projections 16 may be associated with connectors, such as connectors 15 in which event there are relatively small metallic areas exposed but flush with the surface of the cover.

Having described certain exemplary embodiments, the present invention is intended to be limited only by the scope of the following claims.

We claim:
1. A unitary molded one-piece cover for a multi-cell battery having wholly embedded therein a preformed metallic connector disposed so as to extend across cell walls when the cover is positioned on the battery and electrically unite terminals of adjoining cells, the union between connector and terminal when established being wholly within the cover, said connector comprising an elongated body provided with cell terminal-receiving openings at opposite ends, the upper and lower surfaces of said elongated body being beveled toward each other to establish a pronounced taper from the center toward the sides of said body as viewed in transverse cross section to reduce resistance to flow of molding composition around said body while forming said cover.

2. A cover as described in claim 1 wherein the body of the connector is provided with a projection extending outwardly therefrom intermediate of the ends of the connector, the end of said projection being exposed at the surface of said cover.

3. A cover as described in claim 1 wherein said upper and lower surfaces of said elongated body have a substantially oval shaped transverse cross section.

References Cited in the file of this patent

UNITED STATES PATENTS

| | | |
|---|---|---|
| 1,197,246 | Wright | Sept. 5, 1916 |
| 1,377,995 | Willard | May 10, 1921 |
| 1,942,350 | Appel et al. | Jan. 2, 1934 |
| 1,980,903 | Blake | Nov. 13, 1934 |
| 2,618,673 | Shannon et al. | Nov. 18, 1952 |
| 2,886,622 | Shannon et al. | May 12, 1959 |

FOREIGN PATENTS

| | | |
|---|---|---|
| 510,238 | Great Britain | July 27, 1939 |